US012754679B2

(12) United States Patent
Chang

(10) Patent No.: US 12,754,679 B2
(45) Date of Patent: Oct. 6, 2026

(54) MEMORY CIRCUITS WITH HIGH SECURITY AND METHODS FOR OPERATING THE SAME

(71) Applicant: Taiwan Semiconductor Manufacturing Company, Ltd., Hsinchu (TW)

(72) Inventor: Meng-Sheng Chang, Hsinchu City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 2 days.

(21) Appl. No.: 19/081,550

(22) Filed: Mar. 17, 2025

(65) Prior Publication Data

US 2026/0111126 A1 Apr. 23, 2026

Related U.S. Application Data

(60) Provisional application No. 63/708,924, filed on Oct. 18, 2024.

(51) Int. Cl.

*G06F 12/00* (2006.01)
*G06F 3/06* (2006.01)
*G06F 7/58* (2006.01)

(52) U.S. Cl.

CPC .......... *G06F 3/0622* (2013.01); *G06F 3/0655* (2013.01); *G06F 3/0679* (2013.01); *G06F 7/582* (2013.01); *G06F 7/588* (2013.01)

(58) Field of Classification Search

None

See application file for complete search history.

(56) References Cited

U.S. PATENT DOCUMENTS

| | | | |
|---|---|---|---|
| 6,320,787 | B1 | 11/2001 | Ikeda |
| 8,935,775 | B2 | 1/2015 | Fryman et al. |
| 2020/0126600 | A1 | 4/2020 | Kim |

FOREIGN PATENT DOCUMENTS

| | | | |
|---|---|---|---|
| TW | I736252 | B | 8/2021 |

OTHER PUBLICATIONS

Office Action issued in Korean Appl. No. 10-2025-0143259 dated Mar. 30, 2026.

Office Action issued in Taiwan Appl. No. 114117615 dated Apr. 15, 2026.

*Primary Examiner* — Daniel D Tsui

(74) *Attorney, Agent, or Firm* — Foley & Lardner LLP

(57) ABSTRACT

A memory circuit includes a memory array comprising first memory cells and second memory cells, each of the first memory cells configured to store a data bit, and each subset of the second memory cells configured to store repair bits, the repair bits indicating a location of a corresponding first memory cell and a random bit; register circuits, the register circuits configured to transfer or latch the plurality of repair bits; a compare circuit coupled to the register circuits, the compare circuit configured to provide a match signal, in response to determining that an address signal matches the location of the corresponding first memory cell indicated by the repair bits; and a multiplexer coupled to the compare circuit, the multiplexer configured to output the random bit instead of the data bit stored by the corresponding first memory cell, based on the match signal.

20 Claims, 10 Drawing Sheets

MEMORY CIRCUITS WITH HIGH SECURITY AND METHODS FOR OPERATING THE SAME

CROSS-REFERENCE TO RELATED APPLICATION

This application claims priority to and the benefit of U.S. Provisional Application No. 63/708,924, filed Oct. 18, 2024, which is incorporated herein by reference in its entirety for all purposes.

BACKGROUND

The semiconductor industry has experienced rapid growth due to continuous improvements in the integration density of a variety of electronic components (e.g., transistors, diodes, resistors, capacitors, etc.). For the most part, this improvement in integration density has come from repeated reductions in minimum feature size, which allows more components to be integrated into a given area.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
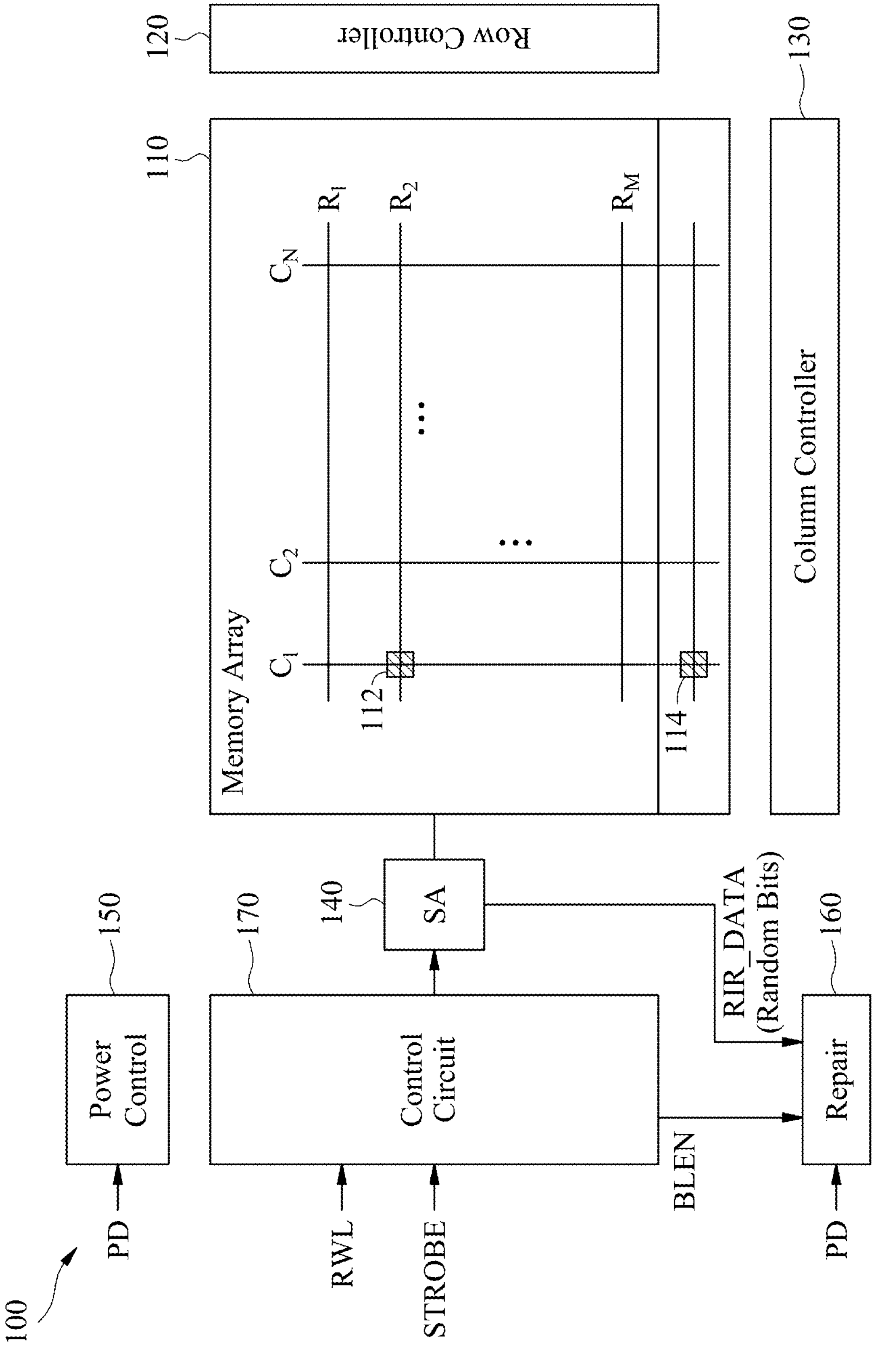
FIG. 1 illustrates a block diagram of an example memory circuit including a repair circuit, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” “top,” “bottom” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with the scaling trend to integrate an increasing number of components on a given area, integrated circuits have become key components of many consumer and commercial electronic products, often replacing discrete components and enhancing functionality. The semiconductor processing technologies that produce these integrated circuits have advanced to the point wherein complete systems, including memories, can be reduced to a single integrated circuit, which can be an application specific integrated circuit (ASIC) device or a system-on-a-chip (SOC) device.

Embedded random access memory (RAM) is among the most widely used cores in the current implementations of integrated circuits. A variety of RAM types have been proposed or adopted such as, for example, one-time-programmable (OTP) memory cells, magnetic random access memory (MRAM) cells, resistive random access memory (RRAM) cells, static random access memory (SRAM) cells, phase change random access memory (PCRAM) cells, or the like. Embedded RAM gives rise to problems during chip manufacturing. For example, because an embedded RAM occupies a significant portion of a chip’s area, the probability that a defect lies within the RAM is relatively high. The RAM thus becomes a controlling factor in chip yield. In general, the embedding of RAM not only makes its own testing difficult, but also impairs testability of all other functions on chip, such as the core logic.

The present disclosure provides various embodiments of a memory circuit including a memory array, a repair circuit, and a compare circuit. The memory array can include a number of first (or main) memory cells that are each configured to store a data bit, and a number of second (or redundant) memory cells that are each configured to store a repair bit. In various embodiments of the present disclosure, the second memory cells can be divided into a number of subsets, each of which can be configured to store a respective subset of the repair bits. Each subset of the repair bits can include (or indicate) at least one of the location of a corresponding one of the first memory cells or a random bit. The random bit may be equal to, different from, or even unrelated to the data bit stored by the corresponding first memory cell. Such a random bit can be provided, for example, by a random generator. The repair circuit can include a number of register circuits configured to load, retrieve, or otherwise receive the repair bits from the memory array or its second memory cells. Each of the register circuits can selectively transfer or forward the received repair bit to a later stage of circuits or latch the received repair bit within the register circuit. The compare circuit, coupled to the multiple register circuits, can compare the location of the corresponding first memory cell indicated by the repair bits with an address signal. The address signal generally indicates the location of a first memory cell to be accessed (e.g., read). Upon identifying that those two locations (indicated by the retrieved repair bits and the received address signal, respectively) match each other, the memory circuit can determine whether to replace the data bit stored by the first memory cell with the random bit stored by the second memory cell.

With the second memory cell storing such a random bit, the disclosed memory circuit can output multiple bits that are intentionally inconsistent with the original repair bits which are supposed to fix the data bits. Alternately stated, outputting the random bits makes the disclosed memory circuit unpredictable for an unauthorized user, which advantageously provides a variety of levels of security for the memory circuit. Accordingly, the memory circuit, as disclosed herein, can be configured as a part of a noise generator. In the existing technologies, such repair bits are intended to provide correct data bits that can replace or repair the data bits stored by the first (main) memory cells, somehow making reverse-engineering feasible. By contrast, the disclosed memory circuit can output a random bit (embedded in the repair bits), once detecting that an address signal, which may be specified by the unauthorized user (or hacker) to retrieve the data bit stored in the first memory cell, matches a location indicated by the repair bits. Given the unpredictability of outputting a plural number of these random bits, it makes reverse-engineering the disclosed memory circuit significantly difficult or almost impossible.

FIG. 1 illustrates a block diagram of a memory circuit 100, in accordance with various embodiments. As shown, the memory circuit 100 includes a memory array 110, a row controller 120 (e.g., including a number of decoders), a column controller 130 (e.g., including a number of decoders), an input/output (I/O) circuit 140 (e.g., including a number of sensing circuits), a power control circuit 150, a repair (or security) circuit 160, and a controller circuit 170. Although, in the illustrated embodiment of FIG. 1, each component of the memory circuit 100 is shown as a separate block for the purpose of clear illustration, in some other embodiments, some or all of the components shown in FIG. 1 may be integrated together. Further, the illustrated embodiment of FIG. 1 is merely an example, and thus, it should be understood that the memory circuit 100 can include any of various other or same components while remaining within the scope of the present disclosure.

The memory array 110 is a hardware component that is configured to store data bits or repair bits. In some embodiments, the memory array 110 is embodied as a semiconductor memory device including a number of memory cells. Although one memory array is shown, it should be appreciated that the memory circuit 100 can include a plural number of memory arrays, each of which may sometimes be referred to as a memory bank. In the illustrative example of FIG. 1, the memory array 110 includes a plurality of main or first memory cells (or otherwise storage units) 112. The memory array 110 includes a number of rows $R_1$, $R_2$, $R_3$ . . . $R_M$, each extending in a first direction and a number of columns $C_1$, $C_2$, $C_3$ . . . $C_N$, each extending in a second direction. Each of the rows/columns may include one or more conductive structures. In some embodiments, each first memory cell 112 is arranged in the intersection of a corresponding row and a corresponding column and can be operated according to voltages or currents through the respective conductive structures of the column and row.

Further, in the example of FIG. 1, the memory array 110 can include one or more redundant or second memory cells (or otherwise storage units) 114 formed in redundant or spare columns or rows. In some embodiments, the second memory cells 114 are configured for "disturbing" corresponding first memory cells 112 by replacing data bits stored by the first memory cells 112 with random bits stored by the second memory cells 114. The term "disturbing," as used herein, refers to providing an unpredictable bit for a main memory cell. Such redundant rows or columns may be physically disposed on an edge or within an edge row/column of the memory array 110. In general, the number of redundant rows/columns depends on a size of the memory array 110 and also depends on the manufacturing processes used to make the memory array 110 and its size. Larger main memory array (with more rows and columns) may be associated with more redundant rows and columns to assist in cell repair. Additionally, if the processes used to manufacture the device have high yield, the number of redundant rows/columns could be lower. In contrast, if the processes have low yield, the number of redundant rows/columns needed would be higher.

In various embodiments of the present disclosure, the first (main) memory cell 112 is configured to store a data bit, and the second (redundant) memory cell 114 is configured to store a repair bit. A plural number of the repair bits (respectively stored by a plural number of the second memory cells 114) can collectively form a repair signal associated with a corresponding one of the first memory cells 112. Further, the plural repair bits of a repair signal can indicate a location of the corresponding first memory cell in the memory array (e.g., at the intersection of which column and which row), whether the plural number of the repair bits are still capable of repairing, and a random bit which can be equal to, different from, or even unrelated with the data bit stored by the corresponding first memory cell.

As a non-limiting example where a repair signal has 16 repair bits, the 16 repair bits (or 16 second memory cells 114) can correspond to one first memory cell 112. Further, 1 of the 16 repair bits can indicate whether these 16 repair bits are still capable of repairing, 1 of the 16 repair bits is a random bit that can be randomly generated, and 14 of the 16 repair bits can indicate an address of the first memory cell 112 in the memory array 110 (sometimes referred to as repair address bits).

In one of various example embodiments of the present disclosure, each of the memory cells 112/114 may be implemented as a one-time-programmable memory cell, for example, an efuse cell. The efuse cell can include a fuse resistor and an access transistor connected in series. The access transistor can be coupled to (e.g., gated by) a corresponding word line (WL). The access transistor can be turned on/off to enable/disable an access (e.g., program, read) to the corresponding fuse resistor. One end or terminal of the fuse resistor is connected to a bit line (BL), with the other end or terminal of the fuse resistor connected to one of the source/drain terminals of the access transistor. Upon being selected, the access transistor of the selected efuse cell is turned on by asserting the WL to allow a program or read path to be formed through its fuse resistor and itself. With a program or read voltage applied on the BL, a data/repair bit can be programmed into or read from the fuse resistor. However, it should be understood that each of the memory cells 112/114 can be implemented as any of various other RAM cells (e.g., an anti-fuse cell, an MRAM cell, an RRAM cell, a PCRAM cell, etc.), while remaining within the scope of the present disclosure.

The row controller 120 is a hardware component that can receive a row address of the memory array 110 and assert a conductive structure (e.g., a WL) at that row address. The column controller 130 is a hardware component that can receive a column address of the memory array 110 and assert one or more conductive structures (e.g., a BL) at that column address. The power control circuit 150 can receive a supply voltage (e.g., VDD) and, based on the supply voltage, provide one or more different operation voltages (e.g., VDDHD, VDDQ, etc.) to respectively drive the components of the memory circuit 100.

For example, VDDHD may be configured for driving logic components of the memory circuit 100, and VDDQ may be configured for programming the memory cells of the memory circuit 100. Further, in some embodiments, the power control circuit 150 can receive a control signal (PD) with a logic state, e.g., logic 1, causing the memory circuit 100 to transition into a power down mode. The I/O circuit 140 is a hardware component that can access (e.g., read) each of the memory cells 112/114 asserted through the row controller 120 and column controller 130. In some embodiments, the I/O circuit 140 can include one or more sensing circuits configured to load the repair bit (e.g., read from the second memory cell 114) into the repair circuit 160 as "RIR_DATA," which includes a number of random bits. The controller circuit 170 is a hardware component that can control the coupled components of the memory circuit 100. In some embodiments, the controller circuit 170 can receive a plural number of control signals (e.g., an RWL signal, a STROBE signal, etc.) to provide a BLEN signal to the repair circuit 160. Based on a logic state of the BLEN signal and/or a logic state of the PD signal, the repair circuit 160 can selectively forward the RIR_DATA to a circuit component in a later stage or latch the RIR_DATA within the repair circuit 160. Detailed descriptions on operation of the memory circuit 100 (e.g., the repair circuit 160) will be provided below.

Figure 2:
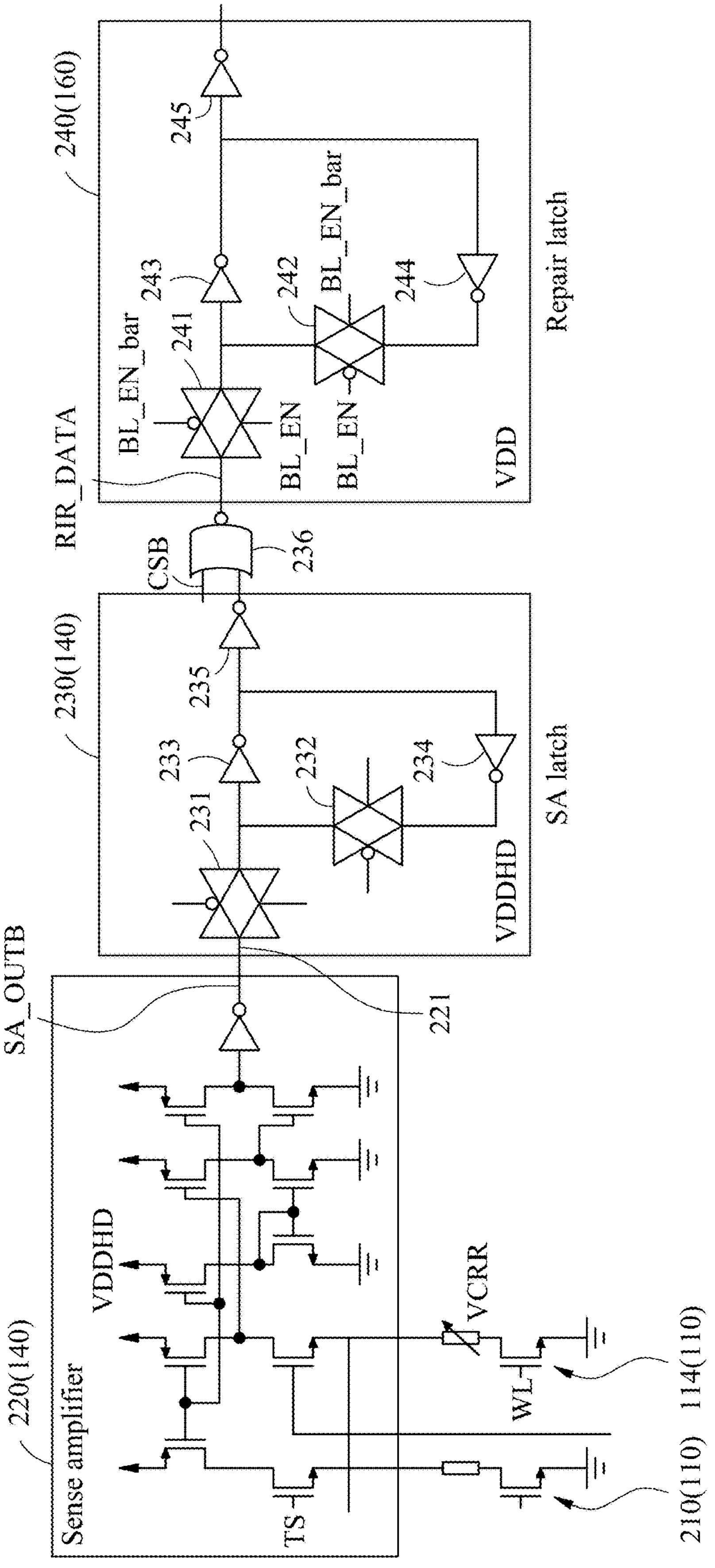
FIG. 2 illustrates a circuit diagram of a portion of the memory circuit of FIG. 1, in accordance with some embodiments.

FIG. 2 illustrates an example circuit diagram of a portion of the memory circuit 100 (FIG. 1), in accordance with various embodiments. For example, one of the second memory cells 114 that stores a repair bit, a portion of the I/O circuit 140, and a portion of the repair circuit 160 are shown in the circuit diagram of FIG. 2. As shown, the memory array 110 includes one second memory cell 114 and one or more reference cells 210; the I/O circuit 140 includes a plural number of transistors that operatively serve as a sense amplifier 220, and includes a sense amplifier latch 230; and the repair circuit 160 includes a repair latch 240. It should be noted that the circuit diagram of FIG. 2 is merely provided as a non-limiting example to illustrate a portion of the memory circuit 100, and thus, the circuit diagram of FIG. 2 can include any suitable circuit implementations of other components of the memory circuit 100 while remaining within the scope of the present disclosure.

In some embodiments, the reference cells 210 can present two resistances representing a high reference resistance and a low reference resistance, respectively. These two resistances can be coupled in parallel with each other and commonly coupled to one side of a voltage comparator (shown as a part of the sense amplifier 220). The sense amplifier 220 may be powered by VDDHD (provided by the power control circuit 150). For example, the voltage comparator, which may be formed of a first p-type transistor and a second p-type transistor, can have a first side and a second side connected to the parallel reference cells 210 and the second memory cell 114, respectively. The second memory cell 114 shown in FIG. 2 can represent a selected one of the second memory cells 114 of the memory array. The reference cells 210 can serve as a current sink to the connected first p-type transistor. The second p-type transistor (on the other side of the voltage comparator) may be drained through the selected second memory cell 114, whose resistance is to be distinguished. When the voltage at the side of the reference cells 210 is lower than the voltage at the side of the selected second memory cell 114, the voltage comparator can be turned on and an output of the sense amplifier 220 can be outputted with a high resistance (i.e., a first logic state). When the voltage at the side of the reference cells 210 is higher than the voltage at the side of the selected second memory cell 114, the voltage comparator can be turned off and an output of the sense amplifier 220 can be outputted with a low resistance (i.e., a second logic state). Accordingly, a logic state of the repair bit stored in the second memory cell 114 can be distinguished and outputted as a signal 221.

The sense amplifier latch 230 can include a first transmission gate 231, a second transmission gate 232, a first inverter 233, a second inverter 234, and a third inverter 235. The sense amplifier latch 230 may be powered by VDDHD (provided by the power control circuit 150). In some embodiments, the transmission gates 231 and 232 may be alternately activated to pass along the received signal. As will be discussed below, the transmission gate 231 can be activated/deactivated based on a logic state of the STROBE signal, and the transmission gate 232 can be activated/deactivated based on the logic state of the STROBE signal. As such, when the transmission gate 231 is activated (with the transmission gate 232 deactivated), the signal 221 can be forwarded through the inverters 233, 235 to a later stage, e.g., NOR gate 236; and when the transmission gate 231 is deactivated (with the transmission gate 232 activated), the (e.g., previously loaded) signal 221 can be latched within the sense amplifier latch 230 (e.g., within the transmission gate 232 and the inverters 233, 234). In some embodiments, one of the inputs of the NOR gate 236 can receive another control signal (CSB), which may be kept at logic 0 except that the memory circuit 100 transitions to the power down mode (e.g., when the PD signal is at logic 1). The other input of the NOR gate 236 can receive the forwarded signal 221. Accordingly, the NOR gate 236 can output the RIR_DATA by NOR'ing the forwarded signal 221 and the CSB signal.

The repair latch 240 can include a first transmission gate 241, a second transmission gate 242, a first inverter 243, a second inverter 244, and a third inverter 245. The repair latch 240 may be powered by the provided supply voltage VDD. Different from the VDDHD driving the sense amplifier 220 and the sense amplifier latch 230 that may be removed when the memory circuit 100 transitioning to the power down mode, the VDD may remain supplied to the memory circuit 100. In some embodiments, the transmission gates 241 and 242 may be alternately activated to pass along the received signal. As will be discussed below, the transmission gate 241 can be activated/deactivated based on a logic state of another control signal (BL_EN_bar), and the transmission gate 242 can be activated/deactivated based on the logic state of the BL_EN signal. As such, when the transmission gate 241 is activated (with the transmission gate 244 deactivated), the RIR_DATA can be forwarded through the inverters 243, 245 to a later stage, e.g., a compare circuit (which will be shown in FIG. 3); and when the transmission gate 241 is deactivated (with the transmission gate 244 activated), the RIR_DATA can be latched within the repair latch 240 (e.g., within the transmission gate 242 and the inverters 243, 244). In some embodiments, depending on the operation mode of the memory circuit 100, the RIR_DATA can be selectively outputted by the repair latch 240 as one of plural repair bits of the repair signal (e.g., a bit_r bit) or latched within the repair latch 240.

Figure 3:
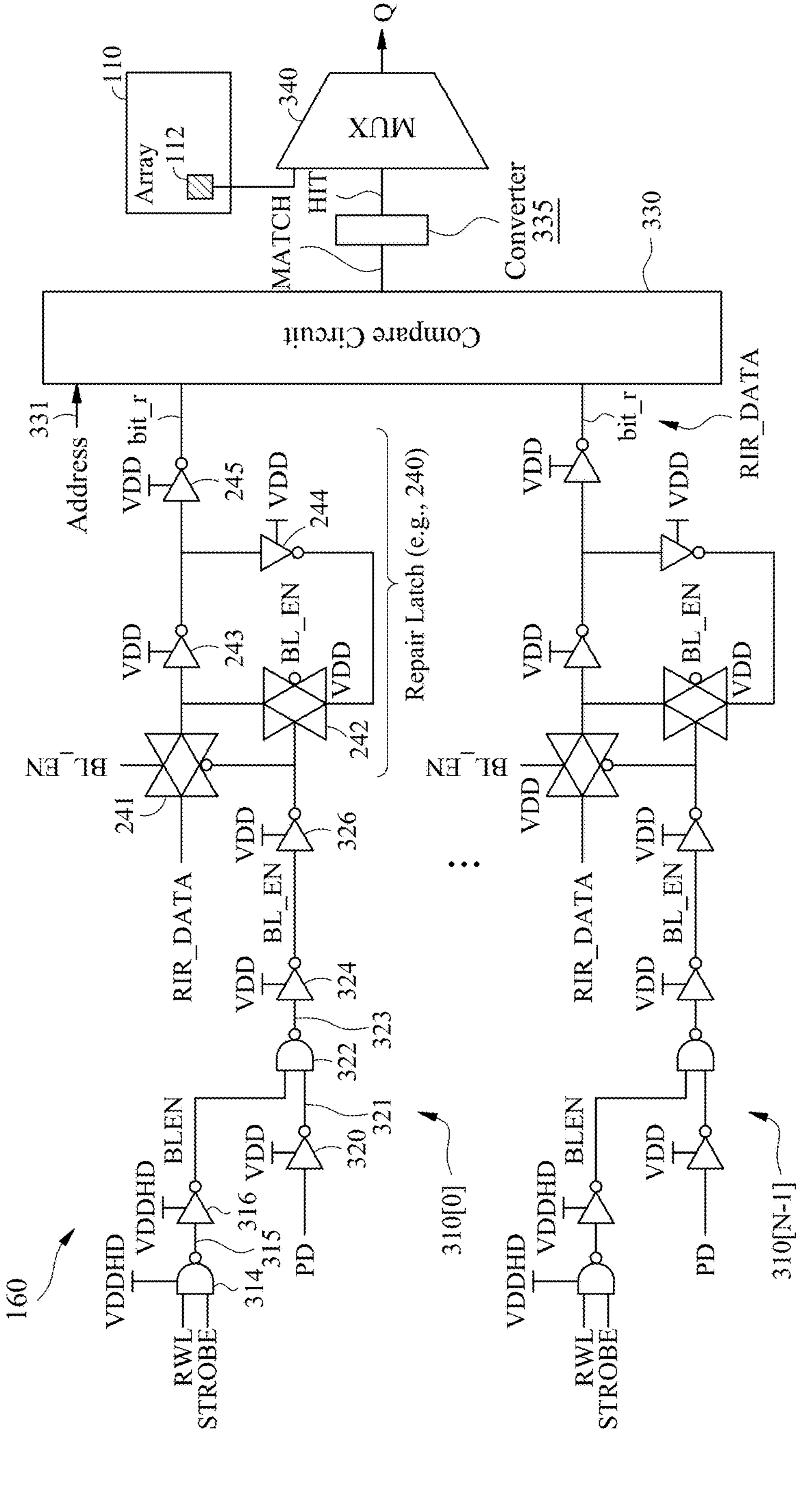
FIG. 3 illustrates a circuit diagram of the repair circuit of FIG. 1, in accordance with some embodiments.

FIG. 3 illustrates a schematic diagram of the repair circuit 160, in accordance with various embodiments. For example, the repair circuit 160 includes a plural number of register circuits 310[0] . . . 310[N−1], where each of the register circuits includes the repair latch 240 (shown in FIG. 2) and other components (e.g., 320, 322, 324, and 326). It should be noted that the schematic diagram of FIG. 3 is merely provided as a non-limiting example, and thus, the schematic diagram of FIG. 3 can include any suitable circuit implementations of other components of the memory circuit 100 while remaining within the scope of the present disclosure.

The repair circuit 160 can further include a compare circuit 330 coupled to the register circuits 310[0] to 310[N−1], a converter 335, and a multiplexer 340. As a non-limiting example, N is equal to 256. That is, the repair circuit 160 has 256 register circuits 310. In some examples, these 256 register circuits 310 can be divided into 16 groups. Each of these 16 groups can output 16 bits (e.g., 16 bit_r bits), which correspond to (e.g., be configured for disturbing) one of the first memory cells 112. The 16 bits of each group, corresponding to a repair signal (as described above) of the corresponding first memory cell 112, can include at least one random bit, in accordance with some embodiments.

Using the register circuit 310[0] as a representative example, the register circuit 310[0] has a NAND gate 314, a first inverter 316, a second inverter 320, a NAND gate 322, a third inverter 324, and a fourth inverter 326. The NAND gate 314 and the inverter 316 may be powered by the voltage VDDHD, while each of these components 320 to 326 may be powered by the supply voltage VDD. The NAND gate 314 can receive the RWL signal and the STROBE signal (provided or forwarded by the controller circuit 170), and NAND the RWL signal and the STROBE signal as a signal 315; the inverter 316 can receive the signal 315 and logically invert the signal 315 as the BLEN signal; the inverter 320 can receive the PD signal and logically invert the PD signal as a signal 321; the NAND gate 322 can receive the signal 321 and the BLEN signal (provided by the controller circuit 170 or by the inverter 316), and NAND the signal 321 and BLEN signal as a signal 323; the inverter 324 can logically invert the signal 323 as another control signal (BL_EN_bar); and the inverter 326 can logically invert the BL_EN signal to control the transmission gates 241-242 of the repair latch, according to some embodiments. In some other embodiments, a resistor can be coupled to one of the inputs of the NAND gate 322 that receives the BLEN signal.

As will be discussed in further detail below, the register circuit (e.g., 310[0]) can switch among various operation modes: a normal read mode, a repair read mode, and optionally a power down mode. When in the power down mode, the register circuit can latch the RIR_DATA; and when in the repair read mode, the register circuit can forward the RIR_DATA. In one aspect, the memory circuit 100 can be configured to disturb the data bit stored by the first memory cell 112 using a random bit stored by the second memory cell 114, during the normal read mode. In another aspect, the memory circuit 100 can be configured to disturb the data bit stored by the first memory cell 112 using a random bit stored by the second memory cell 114, during the repair read mode. Those different operation modes of the memory circuit 100 can be configured through at least the PD signal, RWL signal, and STROBE signal. Further, the BLEN signal can be provided with a logic state based on different logic states of the RWL signal and the STROBE signal.

For example, when the BLEN signal is provided at (or logically combined as) logic 1 and the memory circuit 100 is not configured in the power down mode (e.g., the PD signal=0) and configured in the repair read mode (e.g., the RWL signal=1), the register circuit can forward the RIR_DATA. In another example, when the BLEN signal is provided at (or logically combined as) logic 0 and the memory circuit 100 is not configured in the power down mode (e.g., the PD signal=0) and configured in the repair read mode (e.g., the RWL signal=1), the register circuit can latch the RIR_DATA. In yet another example, when the memory circuit 100 is configured in the power down mode (e.g., the PD signal=1), the register circuit can latch the RIR_DATA regardless of a logic state of the BLEN signal. In yet another example, when the memory circuit 100 is configured in the normal read mode (e.g., the PD signal=0 and the RWL signal=0), the register circuit can latch the RIR_DATA.

In addition to receiving the bit_r bit from each of the register circuits 310[0] to 310[N−1], the compare circuit 330 can further receive an address signal 331 and compare the address signal 331 with the addresses indicated by some of the received bit_r bits. In some embodiments, the address signal 331 can represent a location of one of the first memory cells 112 in the memory array 110 configured to be accessed by a user of the memory circuit 100, e.g., the intersection of which column and which row. In the above example where 256 register circuits 310 are coupled to the compare circuit 330, the compare circuit 330 can receive 16 groups of addresses, each of which has 14 repair address bits.

In response to having a match (e.g., the address signal 331 is the same as the 14 repair address bits of any of the 16 groups of addresses that correspond to a location of one to-be-disturbed first memory cell 112), the compare circuit 330 can provide a "MATCH" signal to the converter 335. Still with the above example, the compare circuit 330 may provide a plural number (e.g., 16) of these MATCH signals, each of which has 16 bits. In some embodiments, these 16 MATCH signals may provide 16 opportunities to match the to-be-disturbed first memory cell 112. The converter 335, which can be implemented as a multiplexer, can convert each of the 16 MATCH signals (with 16 bits) to a "HIT" signal (with 1 bit). For example, if all 14 repair address bits match respective bits specified by the address signal 331, all bits of the MATCH signal can present the same logic state, causing the corresponding HIT signal to be outputted at logic 1.

Figure 5:
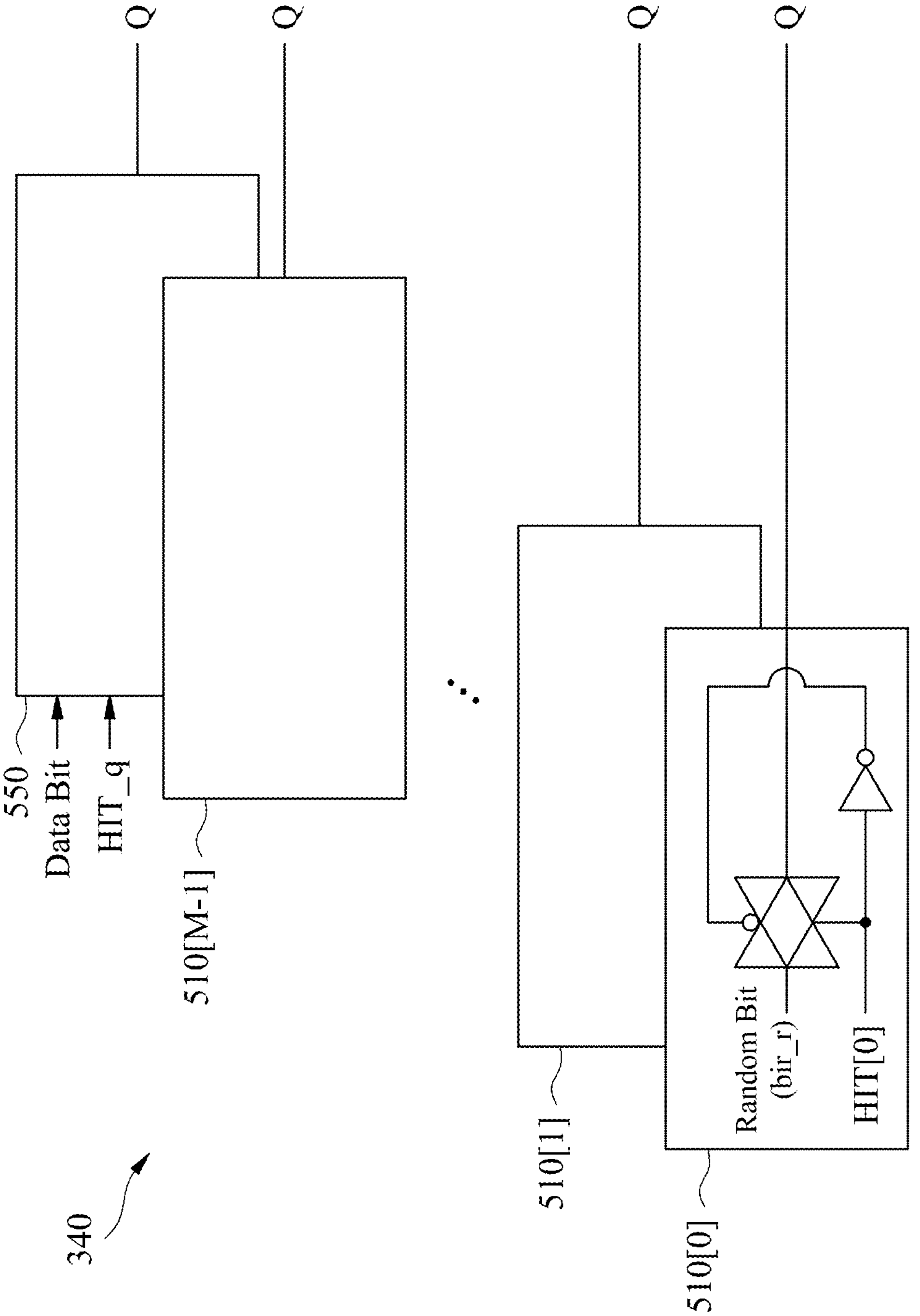
FIG. 5 illustrates a schematic diagram of a portion of a multiplexer of the repair circuit of FIG. 3, in accordance with some embodiments.

The multiplexer 340 can receive those (e.g., 16) HIT signals, each of which may have 1 bit. Further, the multiplexer 340 can receive at least some of the bit_r bits forwarded by the register circuits 310[0] to 310[N−1]. Still with the above example, the multiplexer 340 can receive at least 16 bit_r bits (out of the 16 groups) that each include a random bit configured to disturb the corresponding first memory cell 112. Each of the HIT signals can correspond to a respective one of 16 random bits. Accordingly, the multiplexer 340 can include 16 blocks, each of which is configured to receive a corresponding one of the 16 random logic 1 or 0 and a corresponding one of the 16 HIT signals. The multiplexer 340 can include at least one additional block configured to receive a data bit read from one of the first memory cells 112 and a corresponding HIT_q signal (FIG. 5). The HIT_q signal can be provided with a first logic state (e.g., logic 1) when none of the 16 HIT signals has a match with the address signal 331, and a second logic state (e.g., logic 0) when one of the 16 HIT signals has a match with the address signal 331.

As a result, if there is a match indicated by one of the 16 HIT signals, the multiplexer 340 can select the corresponding random bit, replace the data bit read or otherwise received from the first memory cell 112 with that random bit, and output the random bit as a Q signal; and if there is no match indicated by any of the 16 HIT signals, the multiplexer 340 can select and output the data bit read from the first memory cell 112 as the Q signal. An example circuit diagram of a portion of the compare circuit 330 and an example circuit diagram of the multiplexer 340 will be shown in FIG. 4 and FIG. 5, respectively.

Figure 4:
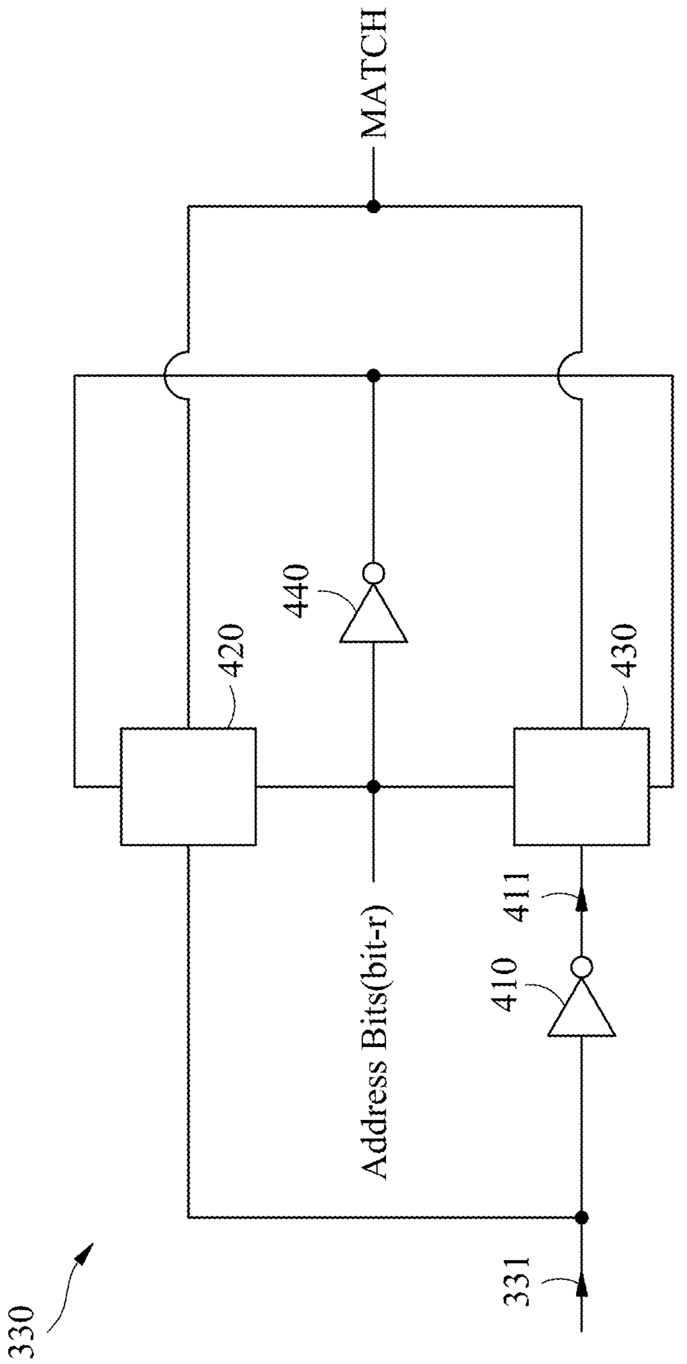
FIG. 4 illustrates a schematic diagram of a portion of a compare circuit of the repair circuit of FIG. 3, in accordance with some embodiments.

In the example of FIG. 4, the compare circuit 330 can include a first inverter 410, a first switch element 420, a second switch element 430, and a second inverter 440 formed as a block, in accordance with some embodiments. The switch elements 420 and 430 can each include a transmission gate. In the above example where the 256 register circuits are divided into 16 groups configured for disturbing 16 of the first memory cells 112, the compare circuit 330 can include at least 16 of these blocks shown in FIG. 4.

For example, each block is configured to receive the address signal 331, and compare the address signal with the repair address bits (e.g., 14 bits) received from a corresponding one of the register circuits 310[0] to 310[N−1] to output a respective MATCH signal. In each of the blocks, the inverter 410 can receive the address signal 331 and logically invert the address signal 331 as a signal 411. The switch element 420 and the switch element 430, which are controlled by the address bits received from the register circuits 310 and by repair address bits logically inverted by the inverter 440, are alternately activated to pass along the signal 331 and signal 411, respectively. In general, when one of the repair address bits matches the a corresponding bit of the address signal 331, one of the bits of the MATCH signal is provided at logic 1; and when one of the repair address bits does not match the corresponding bit of the address signal 331, the bit of the MATCH signal is provided at logic 0.

In the example of FIG. 5, the multiplexer 340 can include a plural number of blocks 510[0] . . . 510[M−1] where M is equal to 16 in the above example, in accordance with some embodiments. Each block 510 is configured to receive a corresponding one of the 16 HIT signals and a corresponding one of the 16 random bits. Each block 510 includes a transmission gate 520 and an inverter 530. The transmission gate 520 can be controlled by the HIT signal and its logically inverted version to be activated, so as to pass along the random bit.

For example, if the HIT signal (e.g., HIT[0]) is provided to the block 510[0] as logic 0 (e.g., no match on the address signal 331 and the address bits determined by the compare circuit 330), the multiplexer 340 will not select the random bit as its output signal Q. When none of other blocks 510[1] to 510[M−1] selects its received random bit, the multiplexer 340 (or block 550) can select the data bit received from the first memory cell 112 as the output signal Q. In some embodiments, the block 550 may be substantially similar to the block 510, e.g., including a transmission gate selectively passing along the data bit based on the above-described HIT_q signal. On the other hand, if the HIT signal (e.g., HIT[0]) is provided as logic 1 (e.g., a match on the address signal 331 and the repair address bits determined by the compare circuit 330), the multiplexer 340 (or block 510[0]) can select the random bit forwarded by the corresponding register circuit (e.g., 310[0]) as the output signal Q. As such, the multiplexer 340 may sometimes be referred to as 17-to-1 multiplexer (selecting 1 out of 17 options).

Figure 6:
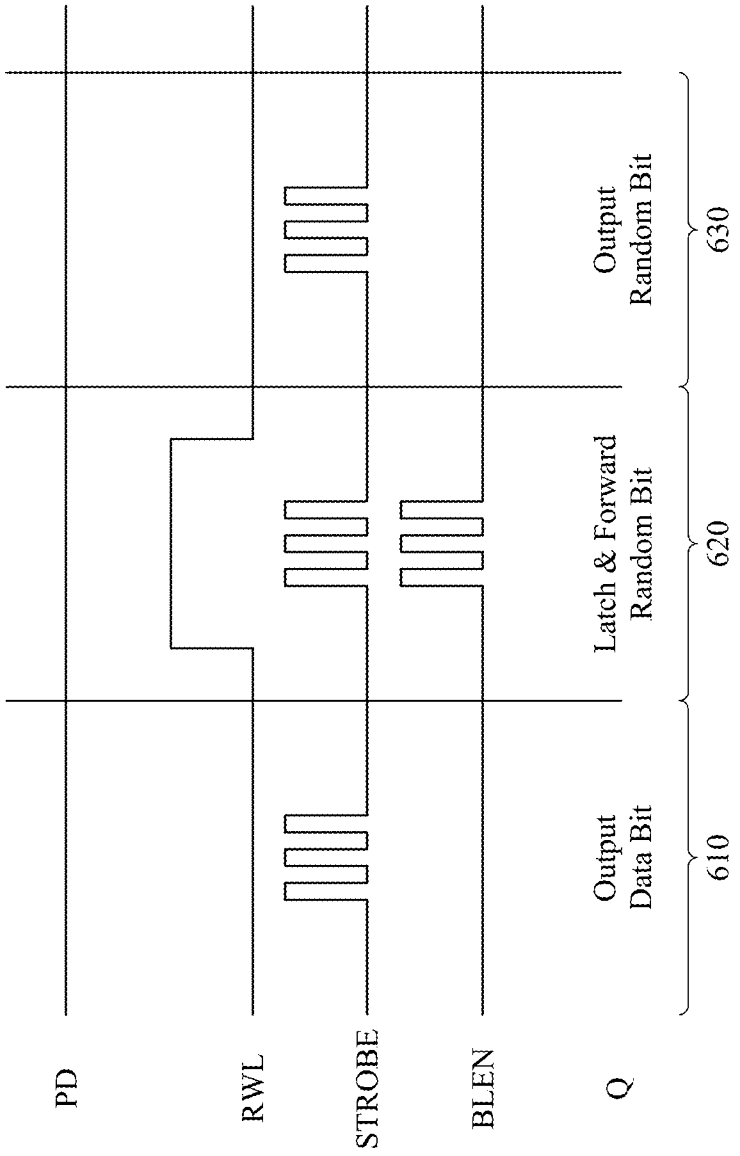
FIG. 6 illustrates waveforms of various signals when operating the memory circuit of FIG. 1 with a first example method, in accordance with some embodiments.

FIG. 6 illustrates waveforms of the control signals, PD, RWL, STROBE, and BLEN, when the memory circuit 100 is configured in different operation modes, in accordance with various embodiments. It should be appreciated that the waveforms of FIG. 6 are merely provided for illustrative purposes. Thus, the waveforms of the PD signal, RWL signal, STROBE signal, and BLEN signal can be arbitrarily scaled while remaining within the scope of the present disclosure.

As shown, the memory circuit 100 can undergo several operation phases (or modes) after being powered up (or provided with a supply voltage). For example, in FIG. 6, the memory circuit 100 can undergo at least operations modes, 610, 620, and 630, which are herein referred to as a first normal read mode, a repair read mode, and a second normal read mode, respectively. It should be noted that the sequence of the operation modes shown in FIG. 6 is not intended to limit the scope of the present disclosure. Stated another way, the memory circuit 100 can undergo a different combination of the operations modes 610 to 630, while remaining within the scope of the present disclosure.

In the operation mode 610, the memory circuit 100 can be configured in the normal read mode (or transition to the normal read mode). When in the normal read mode 610, the PD signal may be kept at logic 0 (unless the memory circuit 100 switches to a power down mode), the RWL signal may be pulled down to logic 0, and the STROBE signal may toggle between logic 0 and logic 1. In some embodiments, the STROBE signal may toggle for a certain number of cycles. When the RWL signal is pulled down to logic 0, the BLEN signal may not follow the STROBE signal, e.g., when the STROBE signal transitions up and down, the BLEN signal may stay at logic 0. As such, the RIR_DATA is latched within the repair latch of each of the register circuits 310, and the multiplexer 340 can read the data bit stored by the first memory cell 112, e.g., after determining no match between the address signal 331 and the repair address bits.

In the operation mode 620, the memory circuit 100 may transition to the repair read mode. When in the repair read mode 620, the PD signal may be kept at logic 0 (unless the memory circuit 100 switches to a power down mode), the RWL signal may be pulled up to logic 1, and the STROBE signal may toggle between logic 0 and logic 1. In some embodiments, the STROBE signal may toggle for a certain number of cycles. When the RWL signal is pulled up to logic 1, the BLEN signal can follow the STROBE signal, e.g., when the STROBE signal transitions up, the BLEN signal also transitions up; and when the STROBE signal transitions down, the BLEN signal also transitions down. Further, when the STROBE signal is at logic 1, the sensing components of the I/O circuit 140 (e.g., the sense amplifier 220, the sense amplifier latch 230) can be activated.

Using the circuit diagrams of FIGS. 2-3 as an example, during the repair read mode 620, when the STROBE signal toggles between logic 0 and logic 1, the sense amplifier latch 230 can transition between forwarding and latching the signal 221 (e.g., a random bit loaded from one of the second memory cells 114) accordingly. For example, when the STROBE signal is at logic 1, the transmission gate 231 is activated and the transmission gate 232 is deactivated, which causes the signal 221 to be forwarded to the repair latch 240 of the register circuit 310 as RIR_DATA; and when the STROBE signal is at logic 0, the transmission gate 231 is deactivated and the transmission gate 232 is activated, which causes the signal 221 (or a repair bit previously loaded from the second memory cell 114) to be latched within the sense amplifier latch 230.

Upon loading RIR_DATA (including a random bit) into the repair latch 240, each of the register circuits 310 can further determine whether to forward or latch the RIR_DATA based on the BLEN signal only (as the PD signal is kept at logic 0). For example, when the BLEN signal is at logic 1, the BL_EN signal is provided at logic 1, such that the transmission gate 241 is activated and the transmission gate 242 is deactivated, which causes the RIR_DATA to be forwarded to the compare circuit 330 as its bit_r; and when the BLEN signal is at logic 0, the BL_EN signal is provided at logic 0, such that the transmission gate 241 is deactivated and the transmission gate 242 is activated, which causes the RIR_DATA to be latched in the repair latch 240. In the current example of FIG. 6, the RIR_DATA, including a plural number of the random bits, may be forwarded to the compare circuit 330 during the operation mode 620.

In the operation mode 630, the memory circuit 100 may transition again to the normal read mode. In some embodiments, right after the repair read mode, the memory circuit 100 can transition to the (second) normal read mode. When in the normal read mode 630, the PD signal may be kept at logic 0, the RWL signal may be pulled down to logic 0, and the STROBE signal may toggle between logic 0 and logic 1. In some embodiments, the STROBE signal may toggle for a certain number of cycles. When the RWL signal is pulled down to logic 0, the BLEN signal may not follow the STROBE signal, e.g., when the STROBE signal transitions up and down, the BLEN signal may stay at logic 0. As such, current RIR_DATA may be latched within the repair latch of each of the register circuits 310, but the previously forwarded RIR_DATA (including the random bit) can be outputted by the multiplexer 340 to replace the data bit retrieved from the first memory cell 112, after determining that a match between the address signal 331 and the repair address bits of the previous RIR_DATA occurs.

Figure 7:
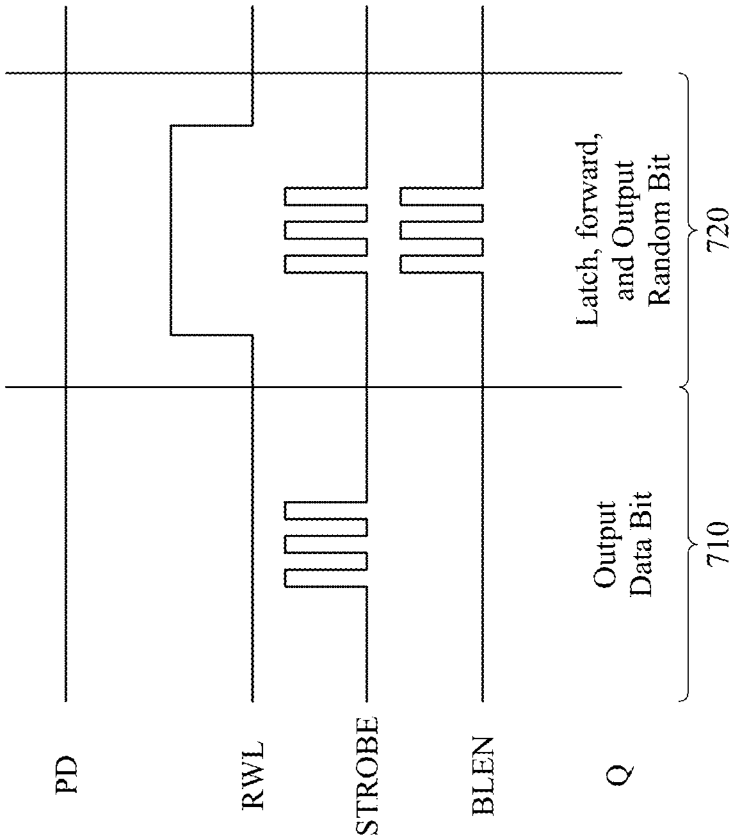
FIG. 7 illustrates waveforms of various signals when operating the memory circuit of FIG. 1 with a second example method, in accordance with some embodiments.

FIG. 7 illustrates waveforms of the control signals, PD, RWL, STROBE, and BLEN, when the memory circuit 100 is configured in different operation modes, in accordance with various embodiments. It should be appreciated that the waveforms of FIG. 7 are merely provided for illustrative purposes. Thus, the waveforms of the PD signal, RWL signal, STROBE signal, and BLEN signal can be arbitrarily scaled while remaining within the scope of the present disclosure.

As shown, the memory circuit 100 can undergo several operation phases (or modes) after being powered up (or provided with a supply voltage). For example, in FIG. 7, the memory circuit 100 can undergo at least operations modes, 710 and 720, which are herein referred to as a normal read mode and a repair read mode, respectively. It should be noted that the sequence of the operation modes shown in FIG. 6 is not intended to limit the scope of the present disclosure. Stated another way, the memory circuit 100 can undergo a different combination of the operations modes 710 to 720, while remaining within the scope of the present disclosure.

In the operation mode 710, the memory circuit 100 can be configured in the normal read mode (or transition to the normal read mode). When in the normal read mode 710, the PD signal may be kept at logic 0 (unless the memory circuit 100 switches to a power down mode), the RWL signal may be pulled down to logic 0, and the STROBE signal may toggle between logic 0 and logic 1. In some embodiments, the STROBE signal may toggle for a certain number of cycles. When the RWL signal is pulled down to logic 0, the BLEN signal may not follow the STROBE signal, e.g., when the STROBE signal transitions up and down, the BLEN signal may stay at logic 0. As such, the RIR_DATA is latched within the repair latch of each of the register circuits 310, and the multiplexer 340 can read the data bit stored by the first memory cell 112, e.g., after determining no match between the address signal 331 and the repair address bits.

In the operation mode 720, the memory circuit 100 may transition to the repair read mode. When in the repair read mode 720, the PD signal may be kept at logic 0 (unless the memory circuit 100 switches to a power down mode), the RWL signal may be pulled up to logic 1, and the STROBE signal may toggle between logic 0 and logic 1. In some embodiments, the STROBE signal may toggle for a certain number of cycles. When the RWL signal is pulled up to logic 1, the BLEN signal can follow the STROBE signal, e.g., when the STROBE signal transitions up, the BLEN signal also transitions up; and when the STROBE signal transitions down, the BLEN signal also transitions down. Further, when the STROBE signal is at logic 1, the sensing components of the I/O circuit 140 (e.g., the sense amplifier 220, the sense amplifier latch 230) can be activated.

Using the circuit diagrams of FIGS. 2-3 as an example, during the repair read mode 620, when the STROBE signal toggles between logic 0 and logic 1, the sense amplifier latch 230 can transition between forwarding and latching the signal 221 (e.g., a random bit loaded from one of the second memory cells 114) accordingly. For example, when the STROBE signal is at logic 1, the transmission gate 231 is activated and the transmission gate 232 is deactivated, which causes the signal 221 to be forwarded to the repair latch 240 of the register circuit 310 as RIR_DATA; and when the STROBE signal is at logic 0, the transmission gate 231 is deactivated and the transmission gate 232 is activated, which causes the signal 221 (or a repair bit previously loaded from the second memory cell 114) to be latched within the sense amplifier latch 230.

Upon loading RIR_DATA (including a random bit) into the repair latch 240, each of the register circuits 310 can further determine whether to forward or latch the RIR_DATA based on the BLEN signal only (as the PD signal is kept at logic 0). For example, when the BLEN signal is at logic 1, the BL_EN signal is provided at logic 1, such that the transmission gate 241 is activated and the transmission gate 242 is deactivated, which causes the RIR_DATA to be forwarded to the compare circuit 330 as its bit_r; and when the BLEN signal is at logic 0, the BL_EN signal is provided at logic 0, such that the transmission gate 241 is deactivated and the transmission gate 242 is activated, which causes the (e.g., previously loaded) RIR_DATA to be latched in the repair latch 240. In the current example of FIG. 7, the RIR_DATA, including a plural number of the random bits, may be forwarded to the compare circuit 330 during the operation mode 720. In some embodiments, during the operation mode 720, the memory circuit 100 may no transition to the normal read mode to output the random bit. For example, the memory circuit 100 may remain at the repair read mode (e.g., 720) to output the random bit, upon determining that a match between the address signal 331 and the repair address bits of the RIR_DATA occurs.

In summary, by controlling the RWL signal, the memory circuit 100 can selectively transition between outputting one or more data bits from the first memory cells 112 and outputting one or more random bits from the second memory cells 114. As such, the memory circuit 100 can be configured as an "on-demand" noise generator. For example, during one or more specified time periods (e.g., by pulling up the RWL signal), the memory circuit 100 can output random or fake data; and during one or more other specified time periods (e.g., by pulling down the RWL signal), the memory circuit 100 can output real data.

Figure 8:
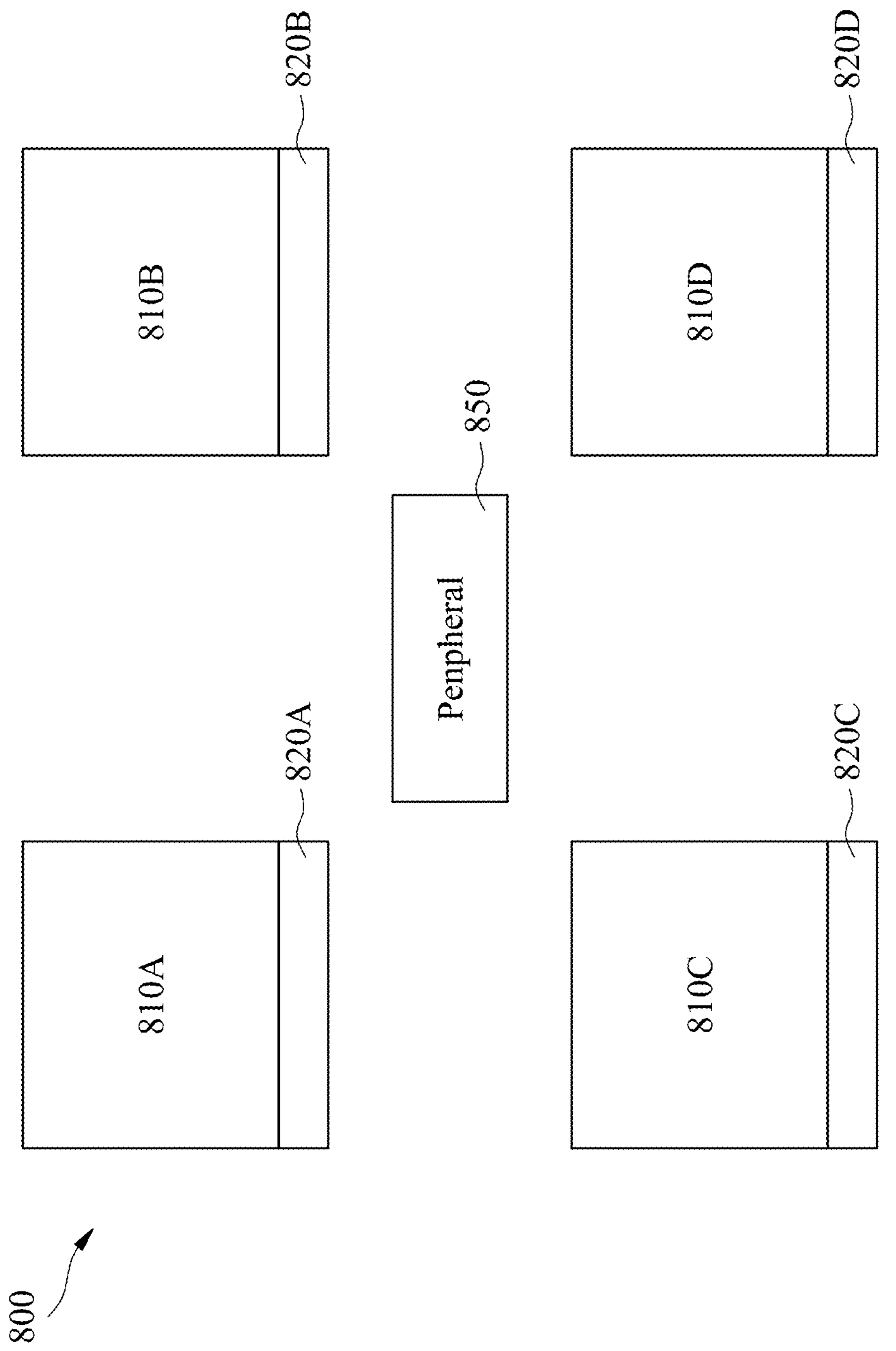
FIG. 8 illustrates an example layout that can be utilized to form the memory circuit of FIG. 1, in accordance with some embodiments.

FIG. 8 illustrates an example layout 800 of a memory circuit that can include the memory circuit 100, in accordance with various embodiments. As shown, the layout 800 includes four memory arrays 810A, 810B, 810C, and 810D, wherein each of the memory arrays 810A to 810D is substantially similar to the memory array 110. For example, each of the memory arrays 810A to 810D includes at least two types of memory cells, one of which is configured to store a data bit (sometimes referred to as main memory cells), and the other of which is configured to store repair bit (sometimes referred to as redundant memory cells). Further, each of the memory arrays 810A to 810D can include a redundant row or column (e.g., 820A, 820B, 820C, 820D), in which the redundant memory cells can be disposed. In some embodiments, the four memory arrays 810A to 810D may be arranged with respect to a peripheral circuit block 850 of the layout 800, which can include a controller circuit (e.g., 170), a power control circuit (e.g., 150), a repair circuit (e.g., 160), etc. The four memory arrays 810A to 810D can share the circuit components formed in the peripheral circuit block 850.

Figure 9:
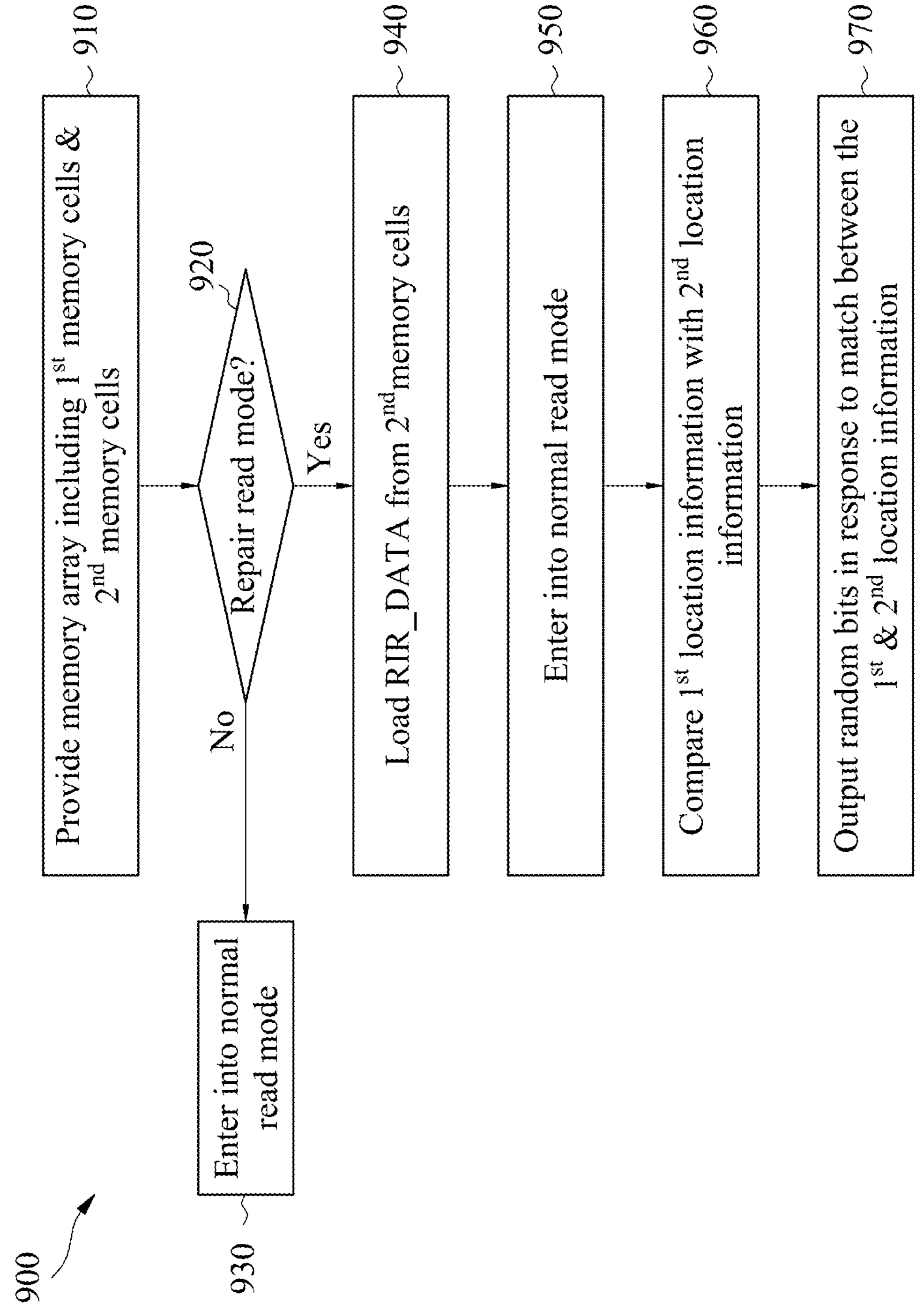
FIG. 9 illustrates a flow chart of an example method for operating a memory circuit that includes a repair circuit, in accordance with some embodiments.

FIG. 9 illustrates a flow chart of an example method 900 for operating a memory circuit that includes or is operatively coupled with a repair circuit, in accordance with various embodiments. For example, at least some of the operations (or steps) of the method 900 can be used to operate the memory circuit 100 (FIG. 1). Further, the method 900 can correspond to the waveforms shown in FIG. 6. It is noted that the method 900 is merely an example, and is not intended to limit the present disclosure. Accordingly, it should be understood that additional operations may be provided before, during, and/or after the method 900 of FIG. 9, and that some other operations may only be briefly described herein.

The method 900 starts with operation 910 of providing a memory array of a memory circuit including a number of first memory cells and a number of second memory cells. In some embodiments, a subset of the second memory cells can correspond to one of the first memory cells, and this subset of the second memory cells can store bits (e.g., RIR_DATA), some of which can indicate first location information of the corresponding first memory cell and include at least one random bit. For example, 16 of the second memory cells 114 can correspond to 1 of the first memory cells 112. Further, 14 of these 16 second memory cells 114 stores bits that can collectively indicate the first location information, and 1 of these 16 second memory cells 114 stores one random bit.

The method 900 continues to operation 920 of determining whether the memory circuit is configured in a repair read mode. In some embodiments, whether the memory circuit is configured in the repair read mode may be determined based on whether the RWL signal is received at logic 1 or 0. If yes (e.g., the RWL signal=1), the memory circuit can load RIR_DATA from the second memory cells (operation 940); and if not (the RWL signal=0), the memory circuit can enter into a normal read mode (operation 930). In the repair read mode, the register circuits 310 can forward the currently loaded RIR_DATA to the compare circuit 330. In the normal read mode, the register circuit 310 can latch the currently loaded RIR_DATA within the register circuit, and thus, the compare circuit 330 may receive previously loaded RIR_DATA (if the memory circuit has previously switched to the repair read mode) or receive arbitrary bits originally stored in the register circuit 310.

Next, the method 900 proceeds to operation 950 of entering again into the normal read mode. In some embodiments, with the memory circuit entering into another normal read mode following the repair read mode, the memory circuit can compare the previously loaded RIR_DATA (e.g., operation 940) with an address signal (second location information) received for accessing one or more of the first memory cells (e.g., operation 960), so as to determine whether to disturb a data bit stored by the accessed first memory cell (e.g., operation 970). For example, the compare circuit 330 can compare the address signal 331 (the second location information), which may be specified by a user to access one of the first memory cells 112, and the previously loaded RIR_DATA, which may include multiple (e.g., 16) groups repair address bits and associated random bits, so as to output multiple (e.g., 16) MATCH signals. These MATCH signals, e.g., each with 16 bits, can be converted to multiple HIT signals, e.g., with 1 bit, respectively. The multiplexer 340 can rely on these HIT signals to determine whether to replace or disturb the data bit retrieved from the first memory cell with the corresponding random bit.

Figure 10:
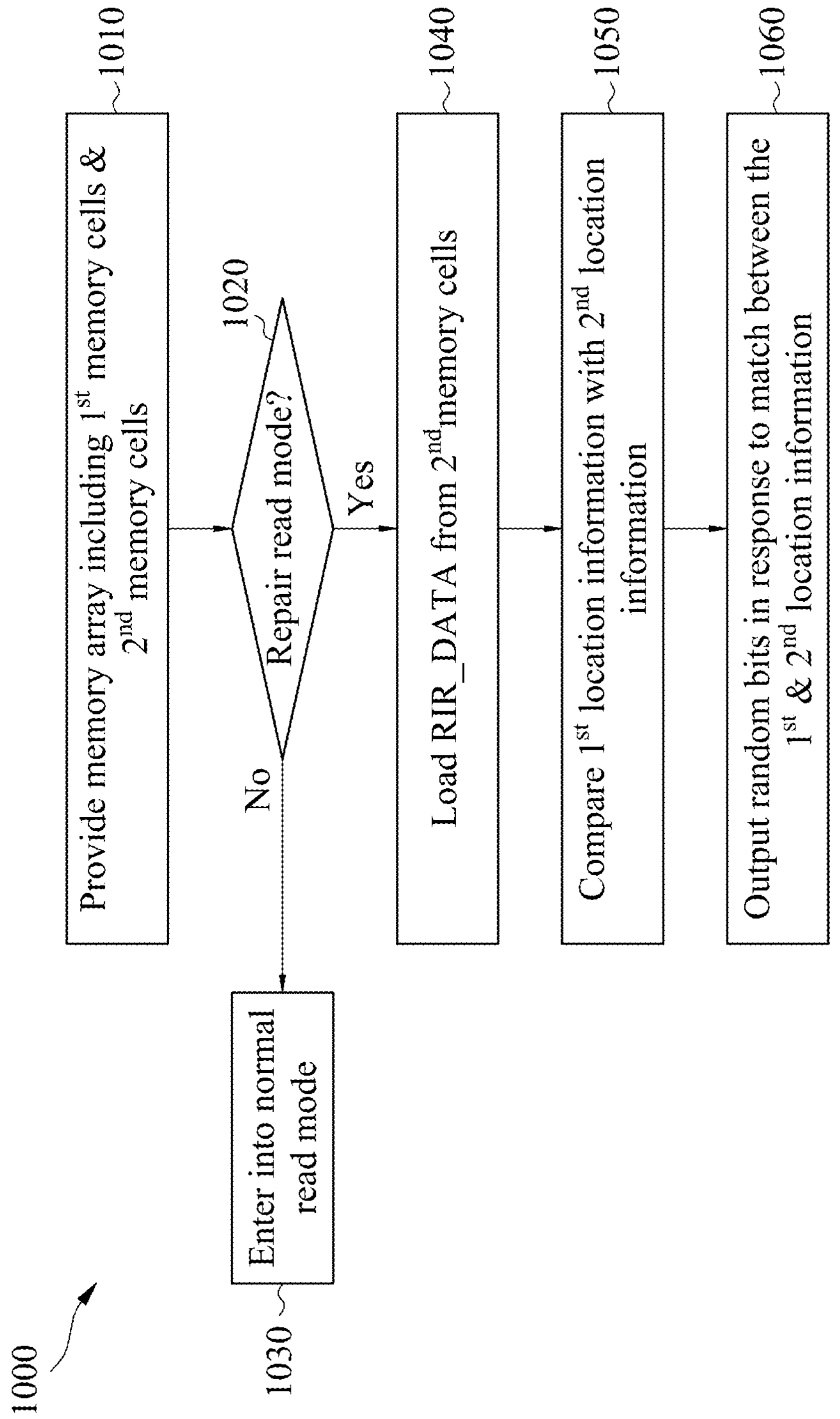
FIG. 10 illustrates a flow chart of another example method for operating a memory circuit that includes a repair circuit, in accordance with some embodiments.

FIG. 10 illustrates a flow chart of an example method 1000 for operating a memory circuit that includes or is operatively coupled with a repair circuit, in accordance with various embodiments. For example, at least some of the operations (or steps) of the method 1000 can be used to operate the memory circuit 100 (FIG. 1). Further, the method 1000 can correspond to the waveforms shown in FIG. 7. It is noted that the method 1000 is merely an example, and is not intended to limit the present disclosure. Accordingly, it should be understood that additional operations may be provided before, during, and/or after the method 1000 of FIG. 10, and that some other operations may only be briefly described herein.

The method 1000 starts with operation 1010 of providing a memory array of a memory circuit including a number of first memory cells and a number of second memory cells. In some embodiments, a subset of the second memory cells can correspond to one of the first memory cells, and this subset of the second memory cells can store bits (e.g., RIR_DATA), some of which can indicate first location information of the corresponding first memory cell and include at least one random bit. For example, 16 of the second memory cells 114 can correspond to 1 of the first memory cells 112. Further, 14 of these 16 second memory cells 114 stores bits that can collectively indicate the first location information, and 1 of these 16 second memory cells 114 stores one random bit.

The method 1000 continues to operation 1020 of determining whether the memory circuit is configured in a repair read mode. In some embodiments, whether the memory circuit is configured in the repair read mode may be determined based on whether the RWL signal is received at logic 1 or 0. If yes (e.g., the RWL signal=1), the memory circuit can load RIR_DATA from the second memory cells (operation 1040); and if not (the RWL signal=0), the memory circuit can enter into a normal read mode (operation 1030). In the repair read mode, the register circuits 310 can forward the currently loaded RIR_DATA to the compare circuit 330. In the normal read mode, the register circuit 310 can latch the currently loaded RIR_DATA within the register circuit, and thus, the compare circuit 330 may receive previously loaded RIR_DATA (if the memory circuit has previously switched to the repair read mode) or receive arbitrary bits originally stored in the register circuit 310.

Next, the method 1000 proceeds to operation 1050 of comparing the currently loaded RIR_DATA (e.g., operation 1040) with an address signal (second location information) received for accessing one or more of the first memory cells, so as to determine whether to disturb a data bit stored by the accessed first memory cell (e.g., operation 1060). For example, the compare circuit 330 can compare the address signal 331 (the second location information), which may be specified by a user to access one of the first memory cells 112, and the previously loaded RIR_DATA, which may include multiple (e.g., 16) groups repair address bits and associated random bits, so as to output multiple (e.g., 16) MATCH signals. These MATCH signals, e.g., each with 16 bits, can be converted to multiple HIT signals, e.g., with 1 bit, respectively. The multiplexer 340 can rely on these HIT signals to determine whether to replace or disturb the data bit retrieved from the first memory cell with the corresponding random bit.

In one aspect of the present disclosure, a memory circuit is disclosed. The memory circuit includes a memory array comprising a plurality of first memory cells and a plurality of second memory cells, wherein each of the plurality of first memory cells is configured to store a data bit, and each subset of the plurality of second memory cells, associated with a corresponding one of the plurality of first memory cells, are configured to store a plurality of repair bits, the plurality of repair bits indicating a location of the corresponding first memory cell in the memory array and a random bit that is equal to or different from the data bit stored by the corresponding first memory cell; a plurality of register circuits, wherein the plurality of register circuits are configured to transfer or latch the plurality of repair bits; a compare circuit coupled to the plurality of register circuits, wherein the compare circuit is configured to provide a match bit, in response to determining that an address signal matches the location of the corresponding first memory cell indicated by the plurality of repair bits; and a multiplexer coupled to the compare circuit, wherein the multiplexer is configured to output the random bit instead of the data bit stored by the corresponding first memory cell, in response to determining that the match bit is equal to a first logic state.

In another aspect of the present disclosure, a memory circuit is disclosed. The memory circuit includes a memory array comprising a plurality of first memory cells and a plurality of second memory cells, wherein each of the plurality of first memory cells is configured to store a data bit, wherein the plurality of second memory cells are divided into a plurality of subsets, and wherein each of the subsets of second memory cells are associated with a corresponding one of the plurality of first memory cells, and are configured to store a plurality of repair bits, the plurality of repair bits indicating a location of the corresponding first memory cell in the memory array and a random bit that is unrelated with the data bit stored by the corresponding first memory cell; a compare circuit configured to provide a plurality of match bits based on comparing an address signal with the respective locations stored by the subsets of second memory cells; and a multiplexer configured to: output the random bit stored by the corresponding subset of second memory cells, in response to determining that a corresponding one of the match bits is equal to a first logic state; and output the data bit stored by the corresponding first memory cell, in response to determining that the corresponding match bit is equal to a second logic state.

In yet another aspect of the present disclosure, a method for operating a memory circuit is disclosed. The method includes providing a memory array including a first memory cell and a plurality of second memory cells, wherein the first memory cells is configured to store a data bit, and the plurality of second memory cells are configured to store first location information of the first memory cell in the memory array and store a random bit that is unrelated with the data bit; receiving an address signal indicating second location information of the first memory cell in the memory array; comparing the first location information with the second location information; and in response to determining that the first location information matches the second location information, outputting the random bit instead of the data bit.

As used herein, the terms "about" and "approximately" generally indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory circuit, comprising:

a memory array comprising a plurality of first memory cells and a plurality of second memory cells, wherein each of the plurality of first memory cells is configured to store a data bit, and each subset of the plurality of second memory cells, associated with a corresponding one of the plurality of first memory cells, are configured to store a plurality of repair bits, the plurality of repair bits indicating a location of the corresponding first memory cell in the memory array and a random bit that is equal to or different from the data bit stored by the corresponding first memory cell;

a plurality of register circuits, wherein the plurality of register circuits are configured to transfer or latch the plurality of repair bits;

a compare circuit coupled to the plurality of register circuits, wherein the compare circuit is configured to provide a match bit, in response to determining that an address signal matches the location of the corresponding first memory cell indicated by the plurality of repair bits; and a multiplexer coupled to the compare circuit, wherein the multiplexer is configured to output the random bit instead of the data bit stored by the corresponding first memory cell, in response to determining that the match signal is equal to a first logic state.

2. The memory circuit of claim 1, wherein the multiplexer is configured to output the data bit stored by the corresponding first memory cell, in response to determining that the match signal is equal to a second logic state.

3. The memory circuit of claim 1, wherein each of the plurality of register circuits comprises at least:

a NAND gate;

a first transmission gate;

a second transmission gate;

a first inverter; and a second inverter.

4. The memory circuit of claim 3, wherein the NAND gate is configured to receive a first signal and a second signal, and wherein the first signal is provided at a third logic state in a first operation mode, and at a fourth logic state in a second operation mode.

5. The memory circuit of claim 4, wherein the first signal, when provided at the third logic state, corresponds to the first operation mode, regardless of a logic state of the second signal.

6. The memory circuit of claim 4, wherein the second signal, when provided at the third logic state, corresponds to the first operation mode, with the first signal provided at the fourth logic state, and wherein the second signal, when provided at the fourth logic state, corresponds to the second operation mode, with the first signal provided at the fourth logic state.

7. The memory circuit of claim 4, wherein, in the second operation mode, the first transmission gate is activated to pass a currently received random bit to the compare circuit.

8. The memory circuit of claim 7, wherein, in the first operation mode, the first transmission gate is deactivated, which causes a previously received random bit to be latched within the second transmission gate, the first inverter, and the second inverter.

9. The memory circuit of claim 1, further comprising a sense amplifier circuit operatively coupled between the memory array and the plurality of register circuits.

10. The memory circuit of claim 1, wherein the compare circuit is configured to receive the address signal indicating the location of the corresponding first memory cell.

11. A memory circuit, comprising:

a memory array comprising a plurality of first memory cells and a plurality of second memory cells, wherein each of the plurality of first memory cells is configured to store a data bit, wherein the plurality of second memory cells are divided into a plurality of subsets, and wherein each of the subsets of second memory cells are associated with a corresponding one of the plurality of first memory cells, and are configured to store a plurality of repair bits, the plurality of repair bits indicating a location of the corresponding first memory cell in the memory array and a random bit that is unrelated with the data bit stored by the corresponding first memory cell;

a compare circuit configured to provide a plurality of match signals based on comparing an address signal with the respective locations stored by the subsets of second memory cells; and a multiplexer configured to:

output the random bit stored by the corresponding subset of second memory cells, in response to determining that a corresponding one of the match signals is equal to a first logic state; and output the data bit stored by the corresponding first memory cell, in response to determining that the corresponding match signal is equal to a second logic state.

12. The memory circuit of claim 11, wherein the compare circuit is configured to receive the address signal indicating the location of the corresponding first memory cell.

13. The memory circuit of claim 11, further comprising a plurality of register circuits operatively coupled to the compare circuit.

14. The memory circuit of claim 13, wherein each subset of the plurality of register circuits are configured to:

receive the random bits from a corresponding one of the subsets of second memory cells; and transfer, in a first operation mode, the random bits and the location of the corresponding first memory cell.

15. The memory circuit of claim 13, wherein each subset of the plurality of register circuits are configured to:

receive the random bits from a corresponding one of the subsets of second memory cells; and latch, in a second operation mode, the random bits and the location of the corresponding first memory cell.

16. The memory circuit of claim 13, wherein each of the plurality of register circuits comprises at least:

a NAND gate;

a first transmission gate;

a second transmission gate;

a first inverter; and a second inverter.

17. The memory circuit of claim 11, wherein each of the first memory cells and the second memory cells includes a one-time-programmable memory cell.

18. A method for operating a memory circuit, comprising:

providing a memory array including a first memory cell and a plurality of second memory cells, wherein the first memory cells is configured to store a data bit, and the plurality of second memory cells are configured to store first location information of the first memory cell in the memory array and store a random bit that is unrelated with the data bit;

receiving an address signal indicating second location information of the first memory cell in the memory array;

comparing the first location information with the second location information; and in response to determining that the first location information matches the second location information, outputting the random bit instead of the data bit.

19. The method of claim 18, further comprising:

in response to determining that the first location information does not match the second location information, outputting the data bit.

20. The method of claim 18, wherein each of the first memory cell and the second memory cells includes a one-time-programmable memory cell.

* * * * *